M. A. APPEL.
CUSHION.
APPLICATION FILED AUG. 11, 1915.
1,190,618.
Patented July 11, 1916.
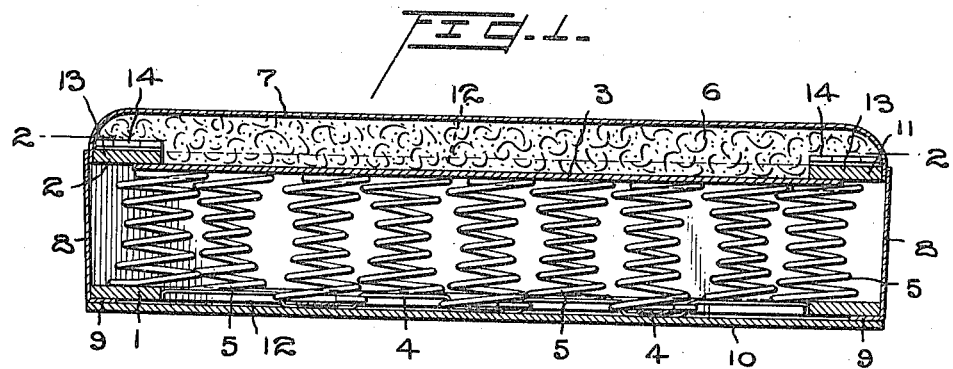
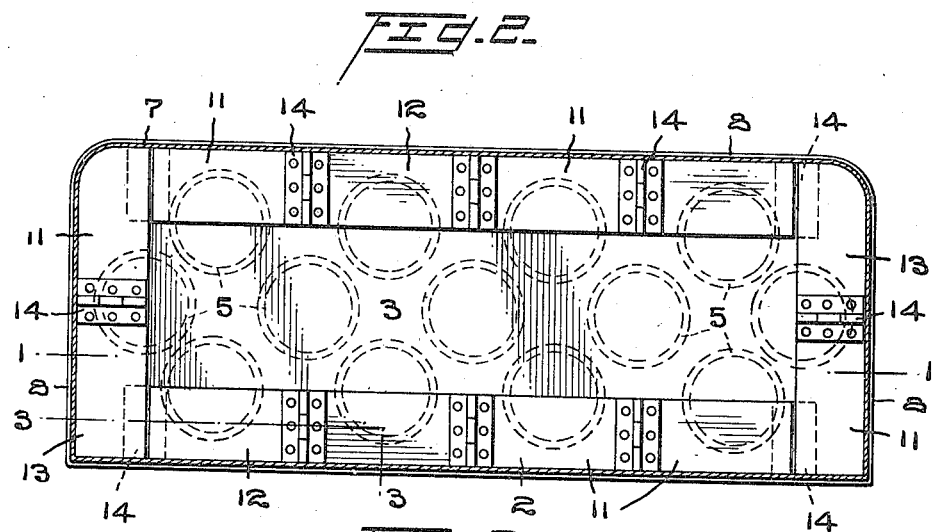
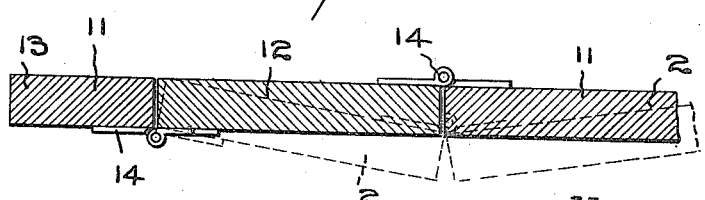
Inventor
Morris A. Appel,
Witnesses
By Joshua R. H. Potts.
His Attorney

UNITED STATES PATENT OFFICE.

MORRIS A. APPEL, OF PHILADELPHIA, PENNSYLVANIA.

CUSHION.

1,190,618. Specification of Letters Patent. Patented July 11, 1916.

Application filed August 11, 1915. Serial No. 45,036.

*To all whom it may concern:*

Be it known that I, MORRIS A. APPEL, a citizen of the United States, residing at Philadelphia, in the county of Philadelphia and State of Pennsylvania, have invented certain new and useful Improvements in Cushions, of which the following is a specification.

My invention relates to improvements in cushions, the object of the invention being to provide a spring cushion having an upper frame composed of rigid sections so hinged together as to permit flexibility of the frame to allow portions of the cushion to move independently of other portions, and thereby provide a yielding support on any portion of the cushion.

A further object is to provide a cushion of the character stated which is especially adapted for use on automobiles or other vehicles, for chairs, settees, sofas, for use as cushions on boats, and in fact for any use to which an ordinary spring cushion can be put.

With these and other objects in view, the invention consists in certain novel features of construction and combinations and arrangements of parts as will be more fully hereinafter described and pointed out in the claims.

In the accompanying drawings: Figure 1 is a view in longitudinal section on the line 1—1 of Fig. 2 illustrating my improved cushion of a shape for use as an automobile or vehicle cushion. Fig. 2 is a view in horizontal section on the line 2—2 of Fig. 1, and Fig. 3 is an enlarged fragmentary detail view on the line 3—3 of Fig. 2.

My improved cushion is provided with a lower rigid frame 1, and an upper flexible frame 2. Both these frames are of the same shape, and it is to be understood that the shapes of the frames will control the shape of the cushion, and that the cushion will be made in any shape desired in accordance with the use to which they are put. A flexible sheet 3 is secured to the under face of the upper frame 2, and lacing strips 4 are secured to the lower frame 1. These lacing strips 4, as well as the frame 1, support the lower ends of coiled springs 5, and the sheet 3 as well as the upper frame 2, rest upon and are preferably connected to the upper ends of the springs 4, so that the springs operate to cushion the upper frame. Above the sheet 3, and over the upper frame 2, I provide filling material 6 which may be wool, excelsior, air, or any other material or fluid which will provide the necessary cushion. A top cover 7 incloses the filling material 6, and is secured at its edges to frame 2. A side cover 8 is secured around the edges of frames 2 and 1, and is preferably projected under frame 1 as shown at 9, and a bottom covering sheet 10 is secured to the lower frame 1 and incloses the inturned edges 9 of the side cover 8.

As above stated the lower frame 1 is rigid. It is preferably composed of strips of wood or other similar material in which the several parts are rigidly secured, so that the frame is to all intents and purposes a single rigid part. The upper frame 2, however, is composed of a plurality of blocks 11, and as the shape of the frame is rectangular, these blocks 11 are utilized to form the sides 12 and ends 13 of the frame 2. In other words, the sides 12 and ends 13 are each formed of a plurality of blocks 11, and the adjacent blocks both at the sides and ends of the frame are connected by hinges 14. The hinges 14 connecting the sides 12 and ends 13, are located on the under face of the frame, while all of the other hinges are located on top of the frame.

The purpose of this arrangement of springs is illustrated clearly in the detail view, Fig. 3, in which it will be noted that a pressure or weight upon the cushion adjacent one end will depress the frame as shown in dotted lines, and the hinges connecting the blocks as above described permit this movement without disturbing the rest of the frame.

The arrangement of blocks and hinges permits a construction of cushion which enables one portion of the cushion to move up and down independent of the rest of the cushion, and thereby a flexibility is had which would not be the case if the entire upper frame must move and the pressure of all of the springs overcome when a weight is put upon the cushion at one point. The blocks and hinges nevertheless provide a strong frame which will maintain its general shape, and a strong and rigid construction is had without detracting from the general flexibility of the cushion.

While I have illustrated my cushion of a particular shape, it is to be understood that the invention is not limited to any particular shape of cushion, but various shapes may be made in accordance with the use to which the cushion is to be put.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A cushion comprising a lower rigid frame, an upper flexible frame having sides and ends composed of rigid sections hinged together, the hinges connecting the sections of the sides and ends located on the upper face of the frame, and the hinges connecting the sides and ends located on the under face of the frame, and springs between the frames, substantially as described.

2. A cushion comprising a lower rigid frame, an upper flexible frame having sides and ends composed of rigid sections hinged together, the hinges connecting the sections of the sides and ends located on the upper face of the frame, and the hinges connecting the sides and ends located on the under face of the frame, flexible material secured to both frames, springs located between the frames and the flexible material, and filling material above the upper frame, and a covering inclosing the filling material, the frames, and the springs, substantially as described.

3. A cushion, comprising a lower rigid frame, an upper flexible frame, and coiled springs between the frames, said upper frame of general rectangular shape consisting of parallel sides and ends, said sides and ends each composed of sections, hinges on top of the upper frame connecting the sections of the sides and ends, and hinges on the bottom of the upper frame connecting the sides and ends, substantially as described.

In testimony whereof I have signed my name to this specification in the presence of two subscribing witnesses.

MORRIS A. APPEL.

Witnesses:
CHAS. E. POTTS,
MARIE JACKSON.

Copies of this patent may be obtained for five cents each, by addressing the "Commissioner of Patents, Washington, D. C."